US012413631B2

(12) United States Patent
Bradley et al.

(10) Patent No.: US 12,413,631 B2
(45) Date of Patent: Sep. 9, 2025

(54) VIRTUAL MEETING MANAGEMENT

(71) Applicant: AT&T Intellectual Property I, L.P., Atlanta, GA (US)

(72) Inventors: Nigel Bradley, Canton, GA (US); Eric Zavesky, Austin, TX (US); James Pratt, Round Rock, TX (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 49 days.

(21) Appl. No.: 17/662,125

(22) Filed: May 5, 2022

(65) Prior Publication Data

US 2023/0362212 A1 Nov. 9, 2023

(51) Int. Cl.
| | |
|---|---|
| *H04L 65/1083* | (2022.01) |
| *G06F 40/166* | (2020.01) |
| *G06F 40/205* | (2020.01) |
| *G06F 40/279* | (2020.01) |
| *G10L 15/08* | (2006.01) |
| *G10L 15/18* | (2013.01) |
| *G10L 15/22* | (2006.01) |
| *G10L 25/63* | (2013.01) |
| *H04L 65/401* | (2022.01) |

(52) U.S. Cl.
CPC ........ *H04L 65/1083* (2013.01); *G06F 40/166* (2020.01); *G06F 40/205* (2020.01); *G06F 40/279* (2020.01); *G10L 15/1822* (2013.01); *G10L 15/22* (2013.01); *G10L 25/63* (2013.01); *H04L 65/401* (2022.05); *G10L 2015/088* (2013.01)

(58) Field of Classification Search
CPC . H04L 65/1083; H04L 65/401; G06F 40/166; G06F 40/205; G06F 40/279; G10L 15/1822; G10L 15/22; G10L 25/63; G10L 2015/088
USPC .......................................... 709/204
See application file for complete search history.

(56) References Cited

U.S. PATENT DOCUMENTS

| | | | | |
|---|---|---|---|---|
| 6,535,909 | B1 * | 3/2003 | Rust ........................ | H04L 67/14 709/204 |
| 9,071,728 | B2 * | 6/2015 | Begeja ................... | H04N 7/155 |
| 11,681,819 | B1 * | 6/2023 | Surazski ............. | G06F 16/9535 726/28 |

(Continued)

*Primary Examiner* — Wing F Chan
*Assistant Examiner* — John Fan

(57) ABSTRACT

The technology described herein is generally directed towards determining that a user is passively attending a meeting via a connected device, collecting data created during the meeting, and outputting information based on the collected data for the user to monitor the meeting. Join criteria can be associated with passive meeting attendee, and if the collected meeting data satisfies the join criteria, the attendee can transition to an active attendee. Keyword data can be used to represent information relevant to a meeting attendee. Based on collected and monitored meeting data presented during the meeting and the keyword data, the meeting can be determined to have reached a relevance/pertinence level by which action is taken to change the user from a passive attendee to an active attendee. This can include a transition period that allows a user to catch up on previous meeting information before becoming an active attendee.

20 Claims, 17 Drawing Sheets

(56) References Cited

U.S. PATENT DOCUMENTS

| | | | |
|---|---|---|---|
| 2002/0133339 A1* | 9/2002 | Gudorf | G06F 16/345 |
| | | | 704/235 |
| 2012/0136942 A1* | 5/2012 | Amidon | H04M 3/42093 |
| | | | 709/206 |
| 2014/0149519 A1* | 5/2014 | Redfern | H04L 51/222 |
| | | | 709/204 |
| 2018/0205797 A1* | 7/2018 | Faulkner | H04L 65/1083 |
| 2019/0108493 A1* | 4/2019 | Nelson | G06Q 10/1095 |
| 2022/0252882 A1* | 8/2022 | Berliner | G06F 3/017 |
| 2022/0271962 A1* | 8/2022 | Patel | G06F 3/167 |

* cited by examiner

VIRTUAL MEETING MANAGEMENT

TECHNICAL FIELD

The subject application relates to the virtual meetings, and more particularly to virtual meetings attendee time management.

BACKGROUND

With remote meetings becoming prevalent, there are many such meetings that a participant needs to or would like to attend virtually. Sometimes these events occur at generally the same time, and/or occur when a participant has other tasks to perform. At present there is no convenient way to appropriately and efficiently attend and/or participate in certain meetings, even remotely.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
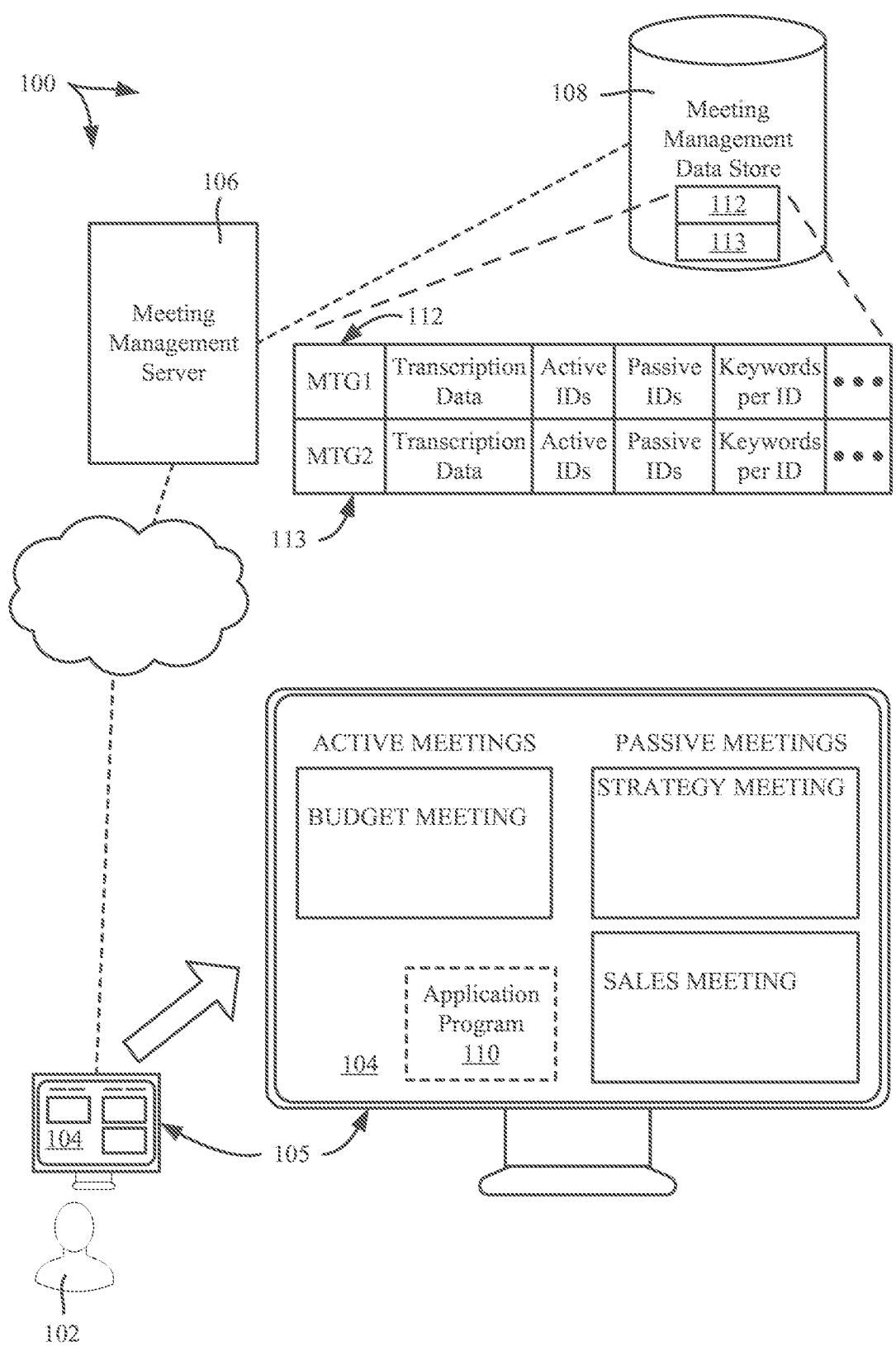
FIG. 1 is a block diagram showing a system of example components that facilitate virtual meeting management, in accordance with various aspects and embodiments of the subject disclosure.

The technology described herein is generally directed towards management of virtual meetings, whereby an attendee's time is more efficiently managed, and permits the attendee to be engaged as a meeting participant when appropriate and when deemed necessary. A user is thus able to be otherwise occupied when he or she is not essential as an active meeting participant.

A user may be an active participant in one or more meetings at a given time and may also be a passive participant in one or more meetings at the same time. While a user's participation in their active meetings may include an audio/video/virtual reality/multimedia or other experience, the user's passive participation in a passively-attended meeting may include a number of features that permits the user to monitor the passive meeting(s) and either choose to join as an active participant, or be automatically joined to the meeting as an active participant if conditions warrant. The technology described herein also enables a user to efficiently "catch up" on the events of the meeting that occurred while he or she was passively monitoring the meeting.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 is a block diagram of example components of a system 100 that allows a user 102 to select among and experience remote meetings as an active or passive participant. Note that the user 102 can be physically attending a meeting as well as remotely attending one or more virtual (remote) meetings.

In general, an interactive user interface 104 presents meeting-related information to a user in some way; a display monitor 105 is shown (including small and enlarged depictions thereof) as one non-limiting example in FIG. 1, although it is understood that any wired or wireless communications device can be used, including, but not limited to, a tablet device, smartphone, smart television and the like, any of which can be used in a generally similar way as described herein. Interaction can be by any human interface device(s), such as pointing device (e.g., mouse), keyboard, touch detection, gesture detection and so forth.

A meeting management server 106 and meeting management data store (e.g., database) 108 facilitates access to the managed meeting(s) and their related data. The meeting management server 106 can, for example, collect data created (and/or possibly referenced) during the meeting. Examples of collected data can include video, audio, speech (including if transcribed into text), materials presented, documents referenced and so forth. Any such data can be stored in the meeting management data store 108 or linked thereto if already maintained in another accessible data store.

Figure 2:
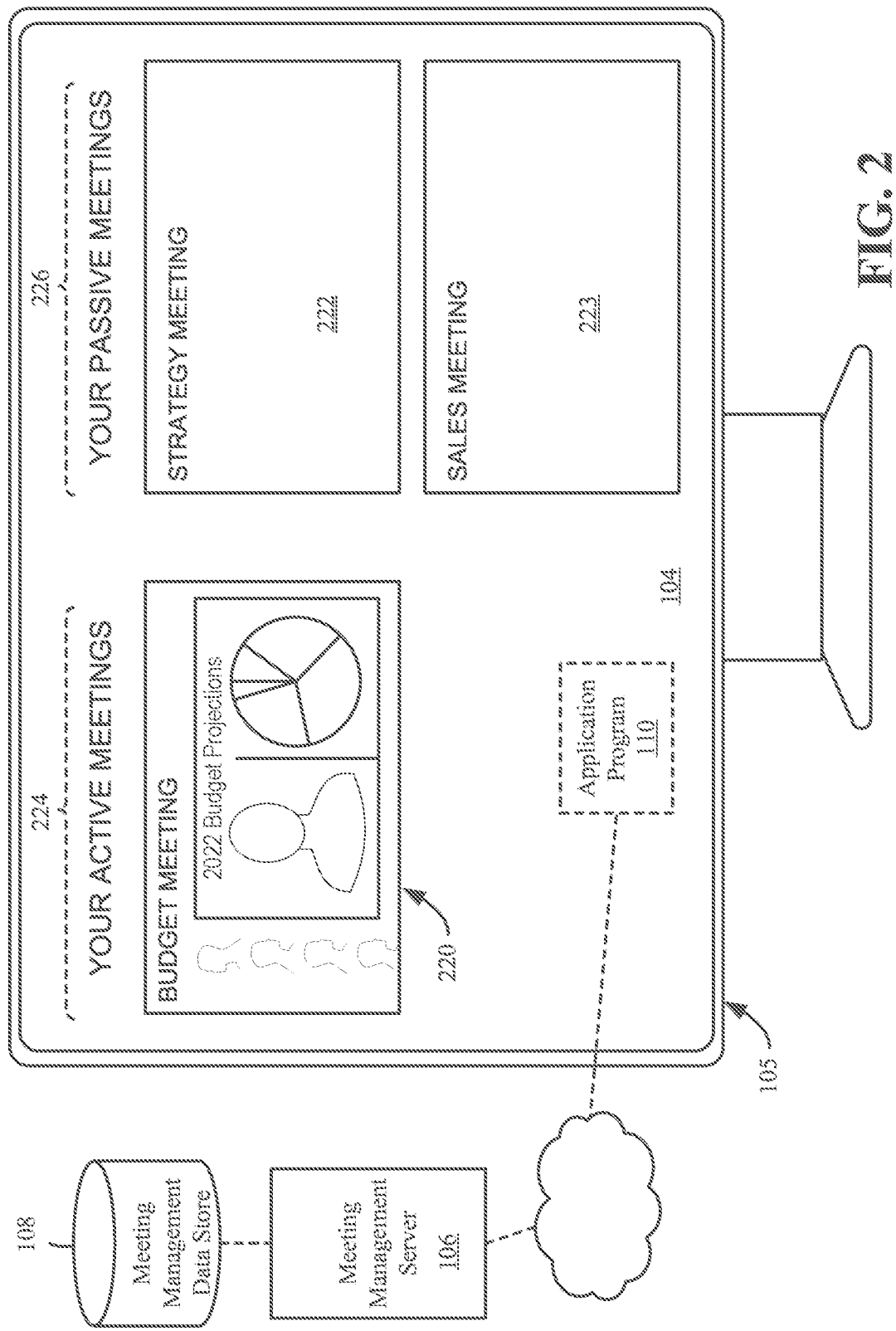
FIG. 2 is an example representation of a display with relevant output presented for a user active in one meeting and passively monitoring other meetings, in accordance with various aspects and embodiments of the subject disclosure.

Thus, a user may use a wired or wireless communications device to participate in one or more active and passive meetings, as generally represented in FIG. 2. For example, the device (e.g., the display monitor 105 or a device coupled thereto) may run an application program 110 that is in communication with the meeting management server 106 (FIG. 1). Note that while the application program 110 is depicted as running behind the display monitor 105, it is understood that the application program 110 can be running in a separate device, such as a personal computer coupled to a display monitor.

The meeting management server 106 may be in communication with the meeting management database 108, which maintains data on meetings in progress, as well as possibly other data, such as related to past meeting. By way of example, a database record may be maintained for each meeting in progress (e.g., record 112 and record 113 for meeting MTG1 and MTG2, respectively), and may include data (or a link to data) such as a running text-based transcript of the meeting, including annotations of who said what and when, a record of materials such as presentations shared during the meeting, active participants and passive participants (e.g., user IDs for each), a set of interest keywords for each participant that represent topics of pertinence to them, and the like. Other example data can include, but is not limited to, the actual audio and/or video, a running count of percentage of time speaking for each active participant, a running emotion predictor for each active participant based on sensed data such as their speech patterns, volume, and text analysis of their spoken words, a running pertinence level predictor for each active and passive participant, e.g., based on how much they are speaking and an analysis of matching of transcript and interest keywords and the like. Such database records can be maintained for meetings no longer in progress, e.g., for some length of time thereafter, to allow those who could not attend to basically do so later to some extent.

For active meetings the user may use their application program 110 to interface with the meeting management server 106 and database 108. As represented in FIG. 2, this permits the user to have access to the display 105 that renders the interface 104 used to participate in and monitor active meeting(s) 220 and passive meetings 222 and 224. The rendered interface 104 may present one or more active meetings in a primary area/portion (e.g., the left side 224 of the interface 104 of FIG. 2), which may output audio, video, shared presentations, listings of participants in the meeting, and other data. The user may use this primary area to participate in and experience their one or more active meetings, such as a user would do normally for a single meeting.

Figure 3:
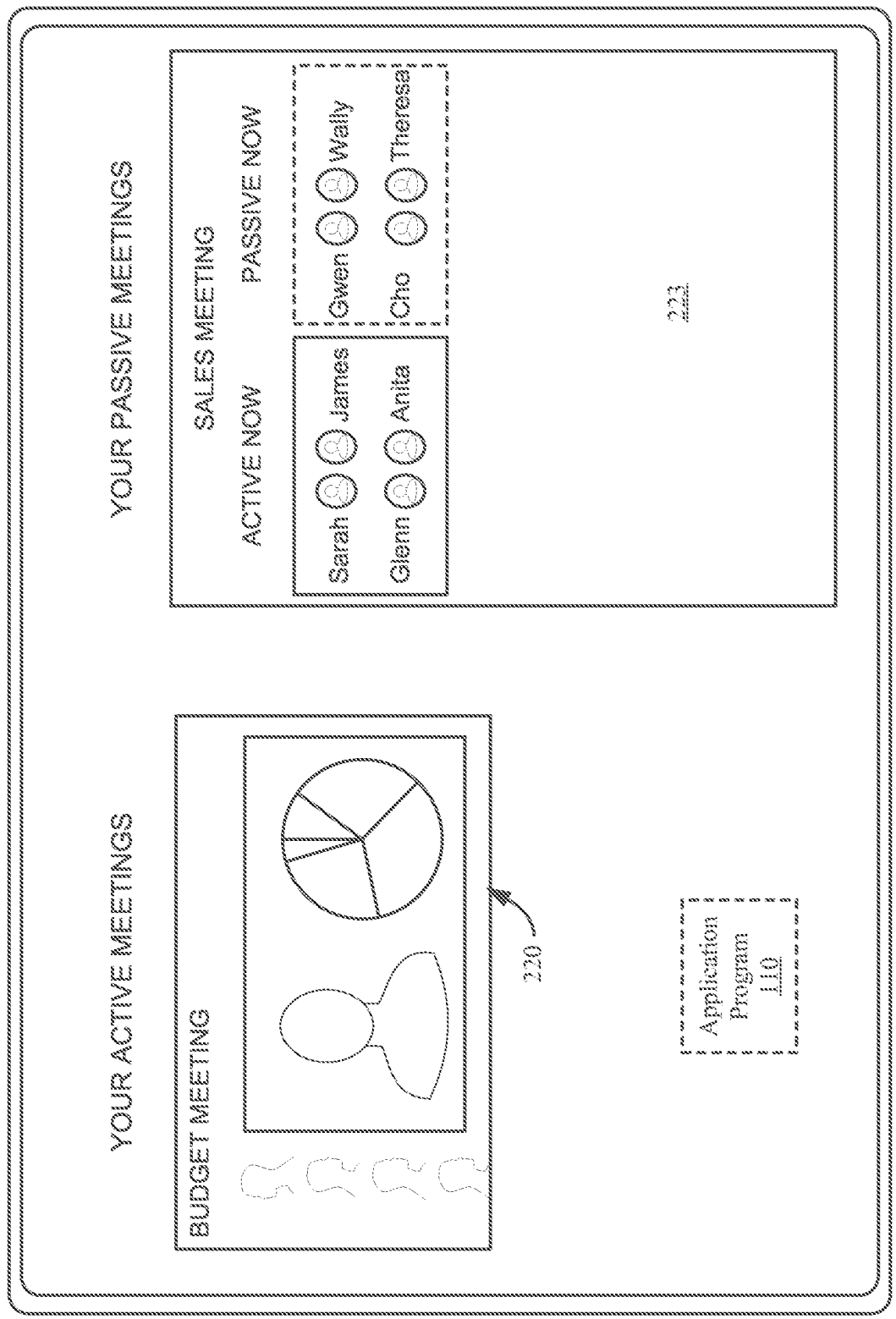
FIG. 3 is an example representation of a display with relevant output presented for a user active in one meeting and monitoring attendees of a passively-attended meeting, in accordance with various aspects and embodiments of the subject disclosure.

In addition, as shown in FIGS. 2 and 3, the interface 104 may be used to provide a feed from the meeting management server 106 of a representation of one or more passive meetings for the user, e.g., in a secondary area/portion (e.g., the right side 226 of the interface 104 of FIG. 2). The passive meetings 222 and 223 may be occurring at the same time as the active meeting, but the user may want to monitor the activity of the passive meetings. Note that as shown in the example of FIG. 3, the user may choose to monitor details of one meeting, the sales meeting 223 in FIG. 3 and not necessarily the same amount of details as the other meeting, e.g., the strategy meeting 222 in FIG. 2. Notwithstanding, although not explicitly shown in FIG. 3, in this example there can be a button or the like to recall the non-displayed (e.g., strategy) meeting 222, swap the monitoring of details sales meeting 223 to instead monitor more details of the strategy meeting 222, have a timer automatically swap back and forth and so on. This can provide a valuable way to monitor two or more passive meetings, particularly if screen real estate is limited.

Note that although FIGS. 1-3 show the user 102 as actively attending a meeting, the user is not required to participate in any active meeting in order to monitor one or more passive meetings. The meeting management server 106 collects data related to the content and activity of each meeting. This data may be analyzed so that the user may be presented with a summary of data that may be used to determine whether conditions may warrant the user becoming an active participant in the meeting.

More particularly, as described herein, the system and/or user monitoring of the one or more passive meetings may result in the user becoming an active participant if conditions warrant. An example condition is if the dialog (e.g., as transcribed or speech recognized with or without transcription) starts referring to the passive attendee or is related to the passive attendee's responsibilities (e.g., project names, supervised subordinate workers, supervisor), and so on.

Figure 4:
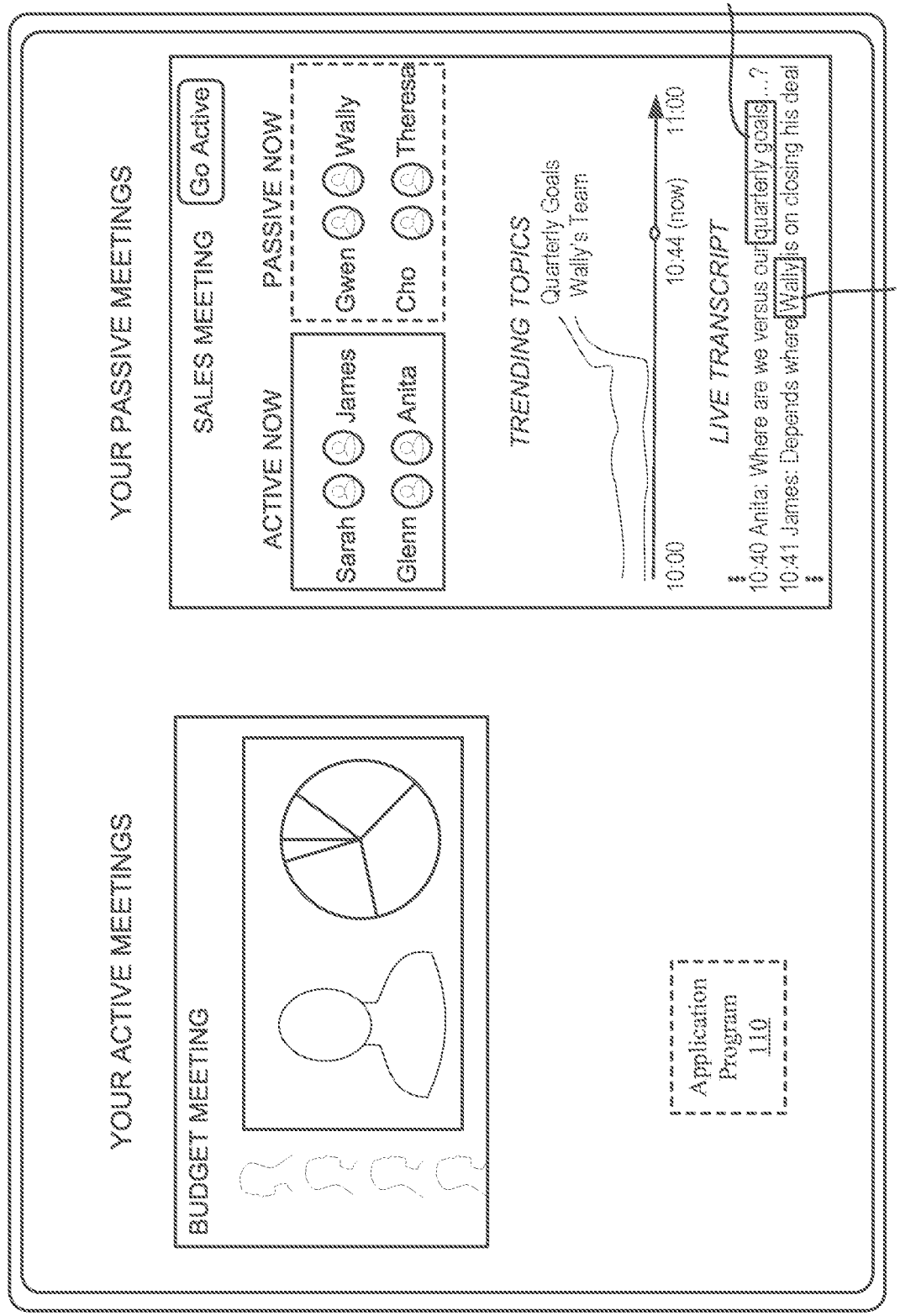
FIG. 4 is an example representation of a display with relevant output presented for a user monitoring content and a generally live dialog transcript of another meeting, in accordance with various aspects and embodiments of the subject disclosure.

By way of example, FIG. 4 illustrates content monitoring of passive meetings. In one example embodiment, the user may be presented with a summary of dialogue matches from the live transcript and one or more of their interest keywords. For example, as represented in FIG. 4 by the boxes 440 and 442 respectively, (which could be colored highlighting instead of boxes, for example), the user named Wally may have specified the term "quarterly goals" and "Wally" as keywords of interest. The meeting management server 106 may monitor the transcript of the sales meeting that Wally is passively participating in. The management server 106 may present (via the application program) displayed output that represents the frequency in which the term is spoken by participants who are active in the meeting. Likewise, Wally may have also specified some other name as an interest keyword (e.g., his assistant's name).

Figure 5:
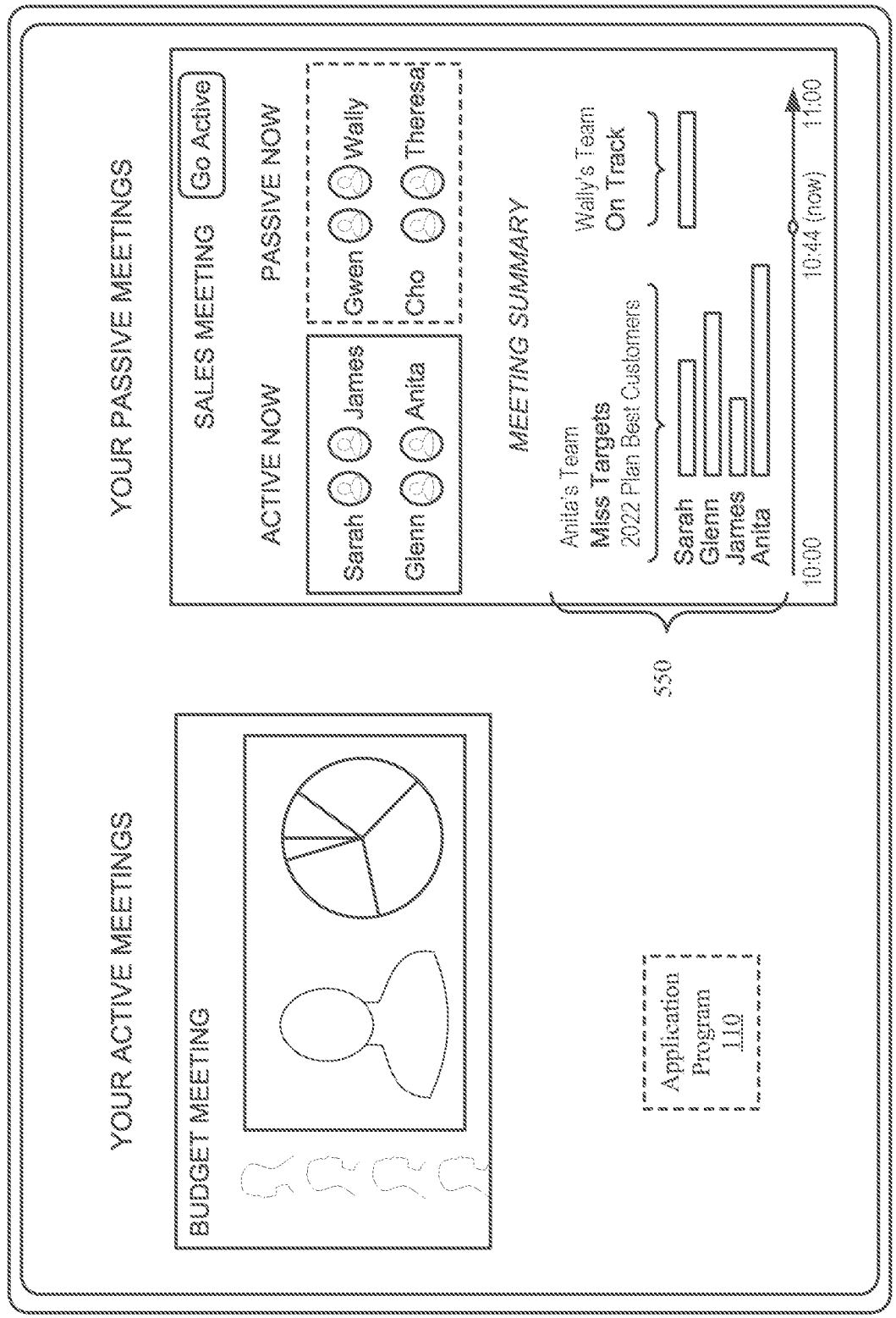
FIG. 5 is an example representation of a display with relevant output presented for a user monitoring participant activity of a passively-attended meeting, in accordance with various aspects and embodiments of the subject disclosure.

FIG. 5 shows another example aspect, namely participant activity monitoring. More particularly, in another example embodiment, the meeting management server 106 may track the frequency with which each of the participants is speaking. This data may be captured and also combined with topics that, for example, may be derived from an analysis of keyword frequency of the transcript so as to present a summary of the conversation during the meeting. Topics discussed may be presented as a word cloud or other means. As shown in the general area labeled 550, participant levels in the discussion may be represented in bar charts or by other means, e.g., graphical output.

Further, as shown in FIG. 5, a first part of the meeting may have been about the topics, displayed with the relative participation as shown. A second part of the meeting may have been detected to have been a change in topics, as shown, through an analysis of the transcript.

Figure 6:
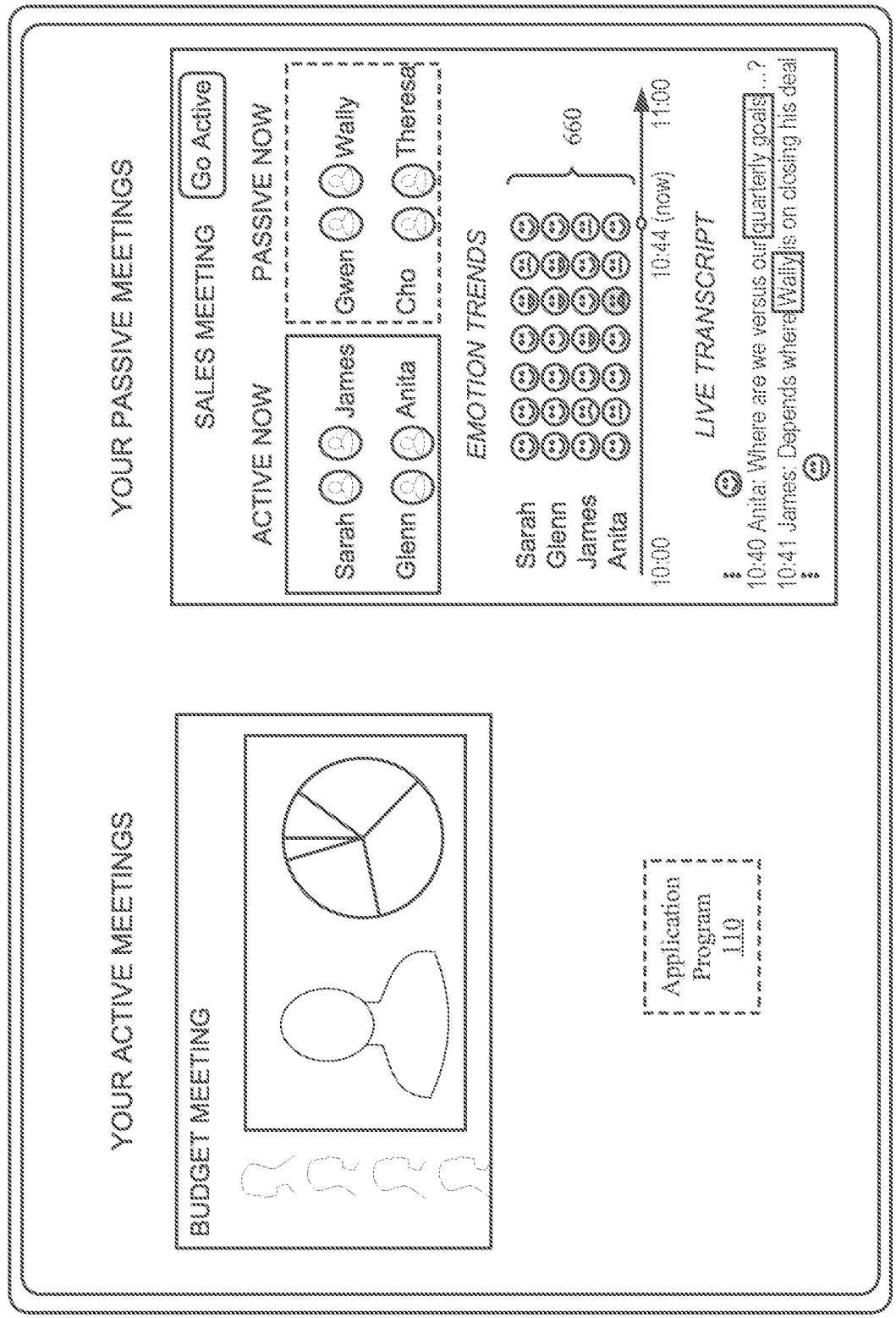
FIG. 6 is an example representation of a display with relevant output presented for a user monitoring participant emotions of a passively-attended meeting, in accordance with various aspects and embodiments of the subject disclosure.

In another embodiment generally represented in FIG. 6, the text of the meeting transcript, video of the meeting, gesture detection and/or audio of the meeting may be analyzed using emotion detection techniques to predict emotions of the active participants in the meeting. The predicted emotions may be mapped to a presentation interface that displays the predicted emotional state of each participant over a period of time. For example, one ways to accomplish this may be to present a thread of emojis (660) over time for each participant who is active. This may permit a passive participant to rapidly monitor emotions of the active participants, which can help a user make a determination as to whether the passive participant should become an active participant in the meeting. Alternative displays to represent emotions, such as a colors, line graphs and/or bar charts over time can be alternatively or additionally used.

Other such criteria that may be derived from meeting content and activity data may likewise be monitored. For example, an important person becomes active, if a number of people suddenly become active, or active attendees increase their participation levels/change emotional states/increase speaking volume, these can be trends that can influence a user's decision (or the system's decision) to go active.

Figure 7:
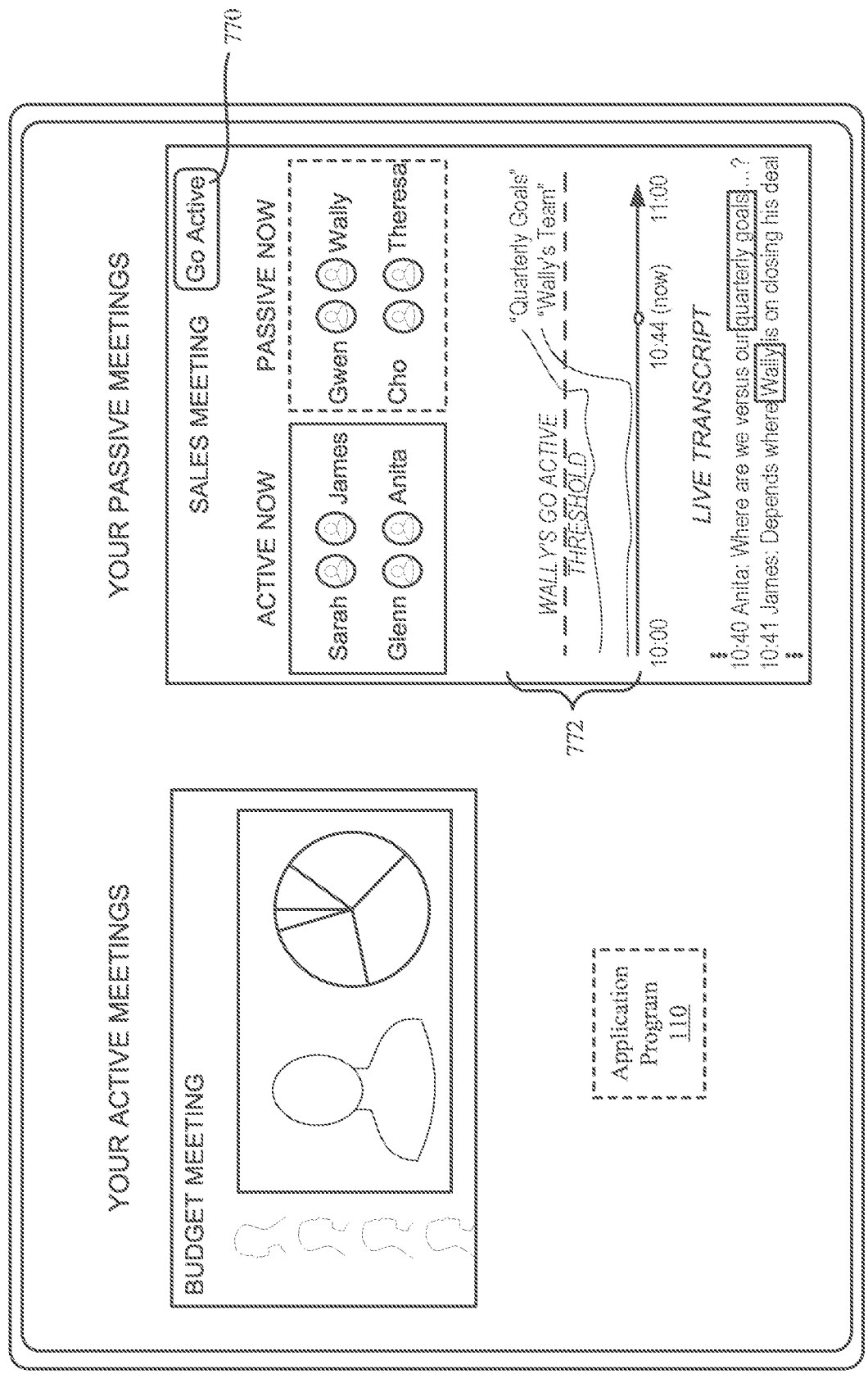
FIG. 7 is an example representation of a display with relevant output presented for a user and system monitoring content (e.g., transcribed data) relevant to the user of a passively-attended meeting, in accordance with various aspects and embodiments of the subject disclosure.
Figure 8:
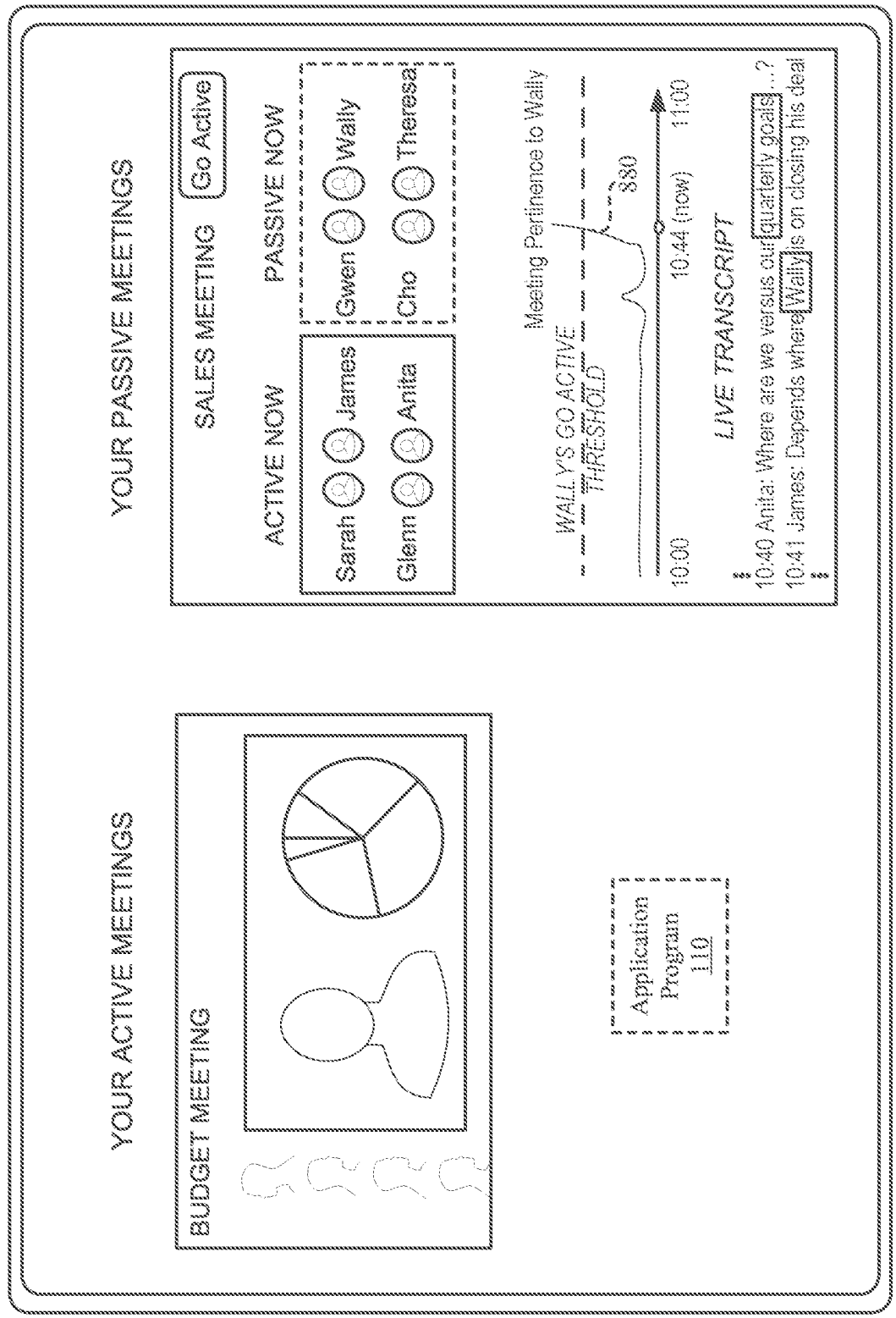
FIG. 8 is an example representation of a display with relevant output presented for a user and system monitoring pertinence to the user of a passively-attended meeting, which can automatically join the user to the meeting as an active participant, in accordance with various aspects and embodiments of the subject disclosure.

FIGS. 7 and 8 show additional concepts related to transitioning from passive to active. An interactive "Go Active" control (e.g., button) 770 allows a user to transition to an active attendee state at any time; this ordinarily transitions the user from any active attendee state of another meeting to a passive attendee state for that meeting; (notwithstanding, it is feasible for a user to be active in more than one meeting, although an audio feed of one only meeting would be likely output).

For automatic transitioning to an active attendee state, a passive meeting participant may specify a "Go Active" threshold (the dashed line to the right of area 772) for one or more of monitored criteria such as content, participant activity, or participant emotions. For instance, the user Wally may have set a threshold to show whether his name or his team's name is mentioned within a threshold number of times; if so, the user's "Go Active" threshold is reached.

As shown in FIG. 8, a user's go active threshold may also be a compilation of factors, any of which may be tracked based on a prediction of the current level of the meeting's pertinence to the user, e.g., represented by the line labeled 880 for Wally. By way of example, Wally may specify a factor or a combination of any of a number of factors, including, but not limited to how much his boss speaks, how much his boss says Wally's name, how often certain projects are mentioned, how often certain customers' names are mentioned, whether his boss's emotions are reaching a threshold, and so forth. Factors can be weighted unevenly in determining pertinence levels, e.g., "Project X" if mentioned can be set as a very pertinent factor, "Project Z" can be a less pertinent factor, how often his boss says Wally's name can be very pertinent factor (e.g., twice in two minutes causes the go active transition), and so on.

Figure 9:
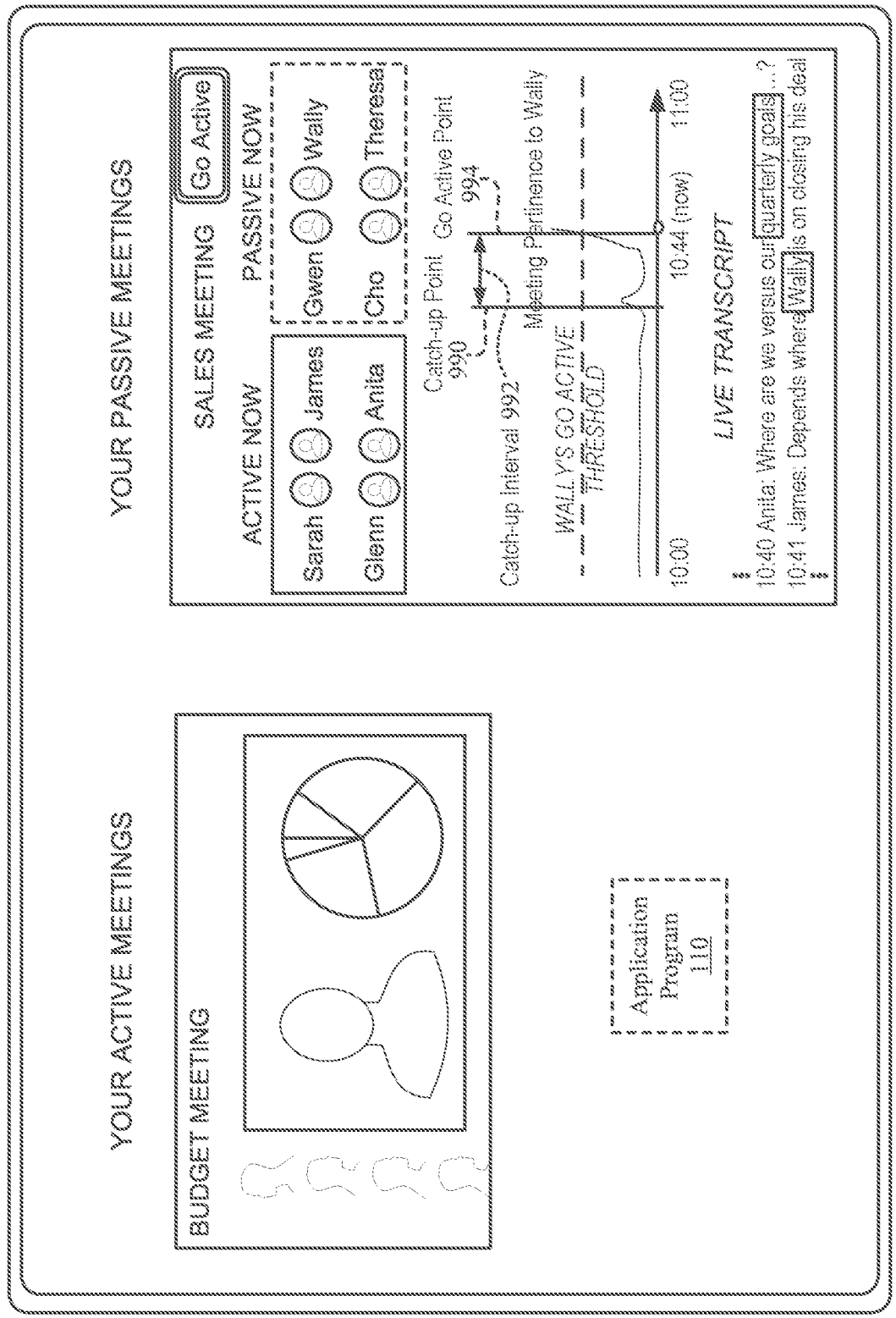
FIG. 9 is an example representation of a display with relevant output presented for a user and system monitoring pertinence to the user of a passively-attended meeting, which facilitates a user catching up on meeting content as part of or prior to joining a meeting as an active participant, in accordance with various aspects and embodiments of the subject disclosure.

Turning to another aspect, the technology described herein allows a user to "catch-up" as part of the transitioning to active, before going active. For example, as shown in FIG. 9, an analysis of the meeting pertinence level to a specific user maybe used to determine when a "catch-up point" in time (vertical line 990, not necessarily actually displayed) may be established. A catch-up point is a point that marks the beginning of a trend towards an increased level of meeting pertinence for the user, which eventually meets that user's threshold.

As also shown in FIG. 9, upon the detection of the catch-up point, a catch-up interval (horizontal arrow 992, not necessarily actually displayed) is defined between the catch-up point and the go active point (vertical line 994, not necessarily actually displayed) when the go-active threshold is met. This catch-up interval represents a period of time during which the content and activities of the meeting may be summarized for the passive participant and presented to them before they go actually active to the meeting. Note that the user can join right away as an active participant, without the catch-up interval, such as if the user is asked a question and needs to respond quickly.

Figure 10:
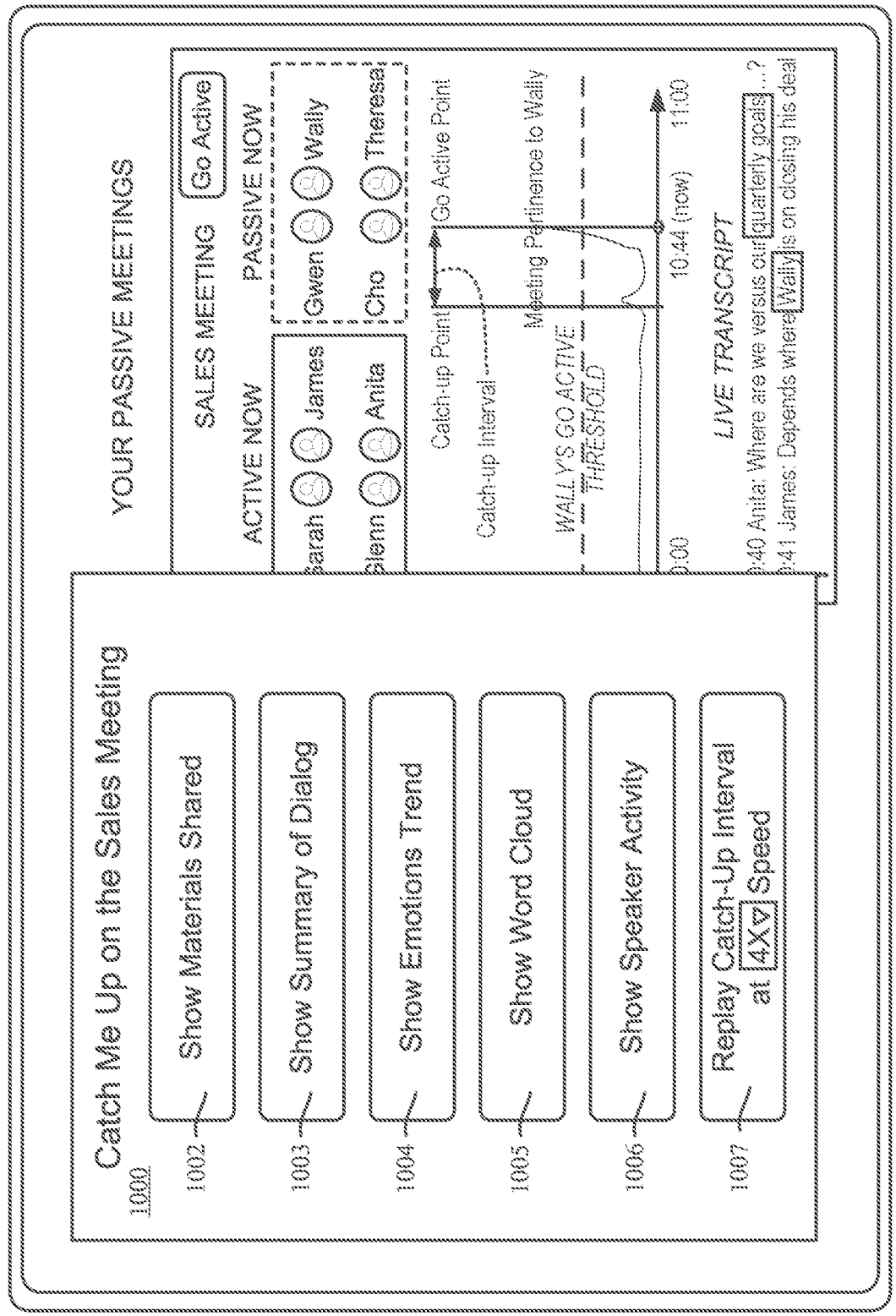
FIG. 10 is an example representation of a display with interactive selections to facilitate a user catching up on meeting content as part of or prior to joining a meeting as an active participant, in accordance with various aspects and embodiments of the subject disclosure.

For example, because the meeting management database has been maintaining relevant data including contact data related to the meeting itself, as shown in the example of FIG. 10, a pop-up window 1000 or the like can present number of different options 1002-1007 become available to the user to use for the catch-up before they go active in the meeting. Non-limiting examples of interactive controls/buttons are shown, including "Show Materials Shared" 1002, "Show Summary of Dialog" 1003, "Show Emotions Trend" 1004, "Show Word Cloud" 1005, "Show Speaker Activity" 1006, and "Replay Catch-Up Interval at 4X Speed" 1007 (where the replay speed can be selected in this example).

Figure 11:
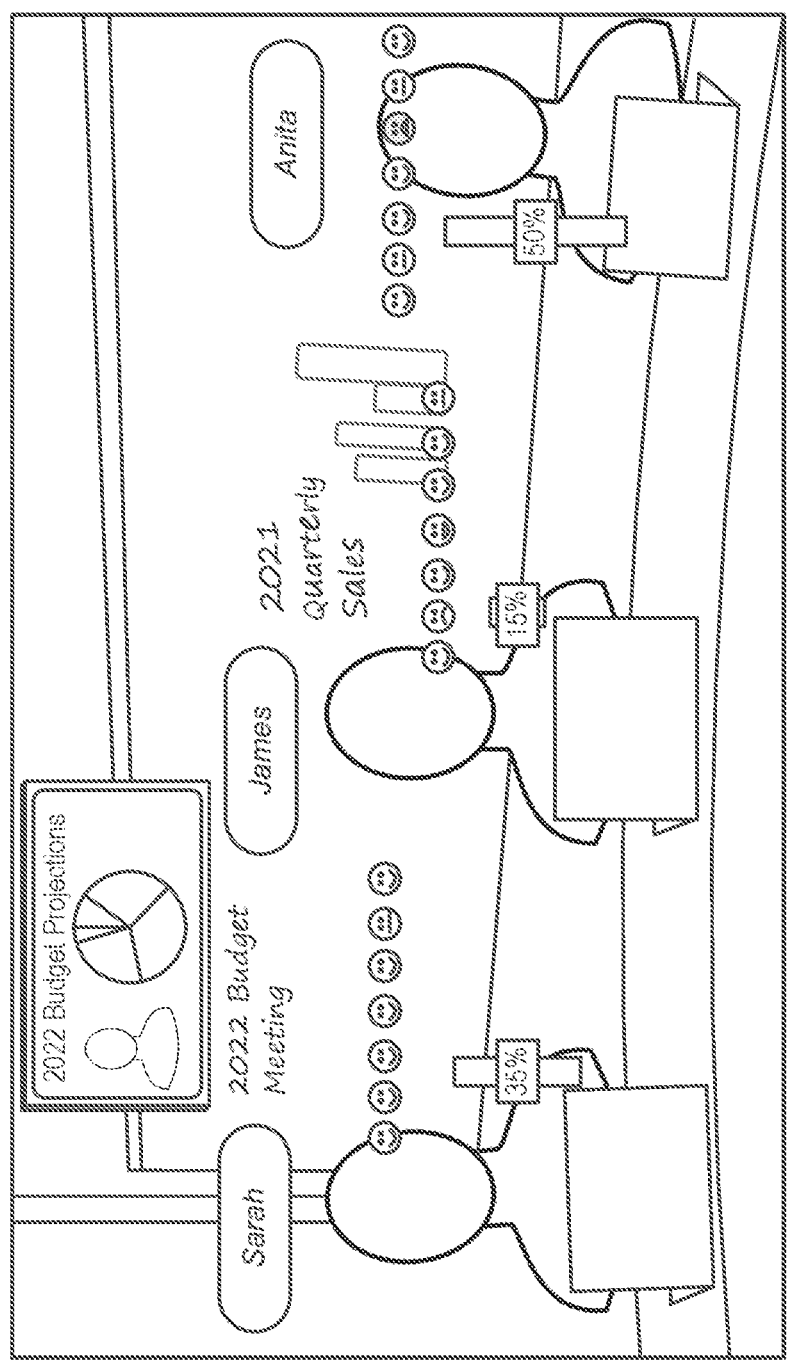
FIG. 11 is an example representation of a virtual meeting with augmented overlaid information that allows a user to ascertain meeting trends before attending the meeting as an active participant, in accordance with various aspects and embodiments of the subject disclosure.

FIG. 11 shows how the technology described herein can be applied to virtual reality meetings. The playback at fast forward speed (control 1007, FIG. 10) maybe used as a catch-up tool, and also may apply to a playback of a virtual reality meeting. In such a case, the catch up data trends may be overlaid on top of virtual reality (e.g., avatars) in the playback so that before the user goes active in the meeting, the user may get a sense of the mood or "vibe of the room" as well as an indication of per-participant pertinence or speaking percentage or the like.

Figure 12:
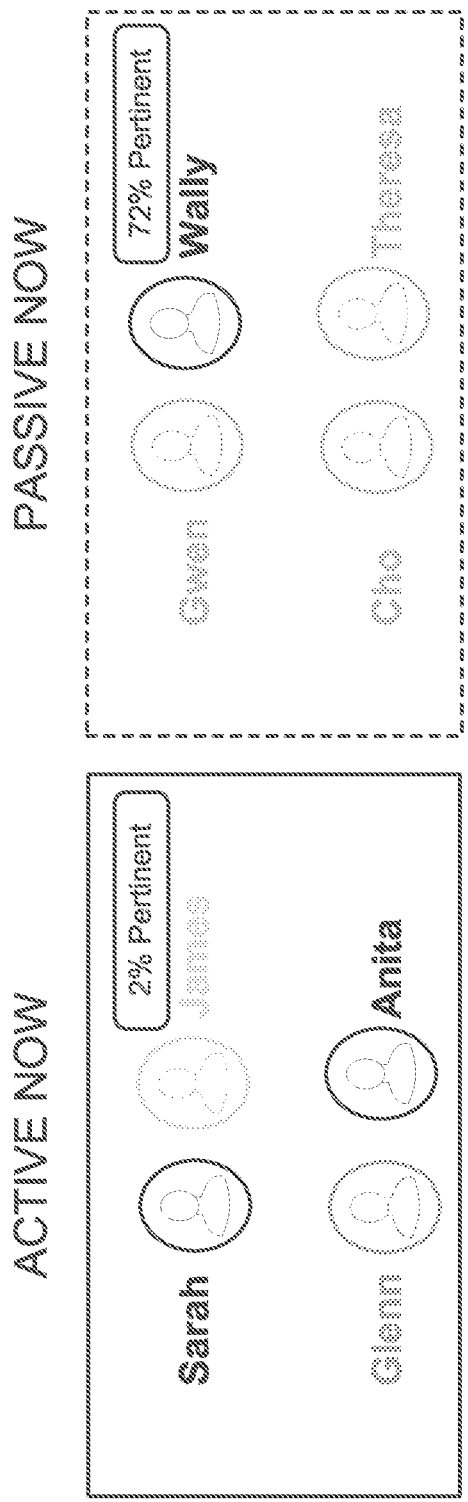
FIG. 12 is an example representation of how the visual representations of meeting participants can be modified to indicate participation levels, in accordance with various aspects and embodiments of the subject disclosure.

The server 106 (FIG. 1) may also use the meeting pertinence estimate for each of the participants, including the active and passive participants, to change the user interface of the meeting such that the level of pertinence and participation for each of the participants may be reflected in the user interface. As an example shown in FIG. 12, if the meeting pertinence for James is trending low, then his participation as an active participant may be shown as though James is fading away; if a user recognizes this and doesn't want James to go away, the user can ask James a question so that James responds and stays active. If the pertinence level for James reaches a low threshold, he may be automatically moved to the passive participant level. Likewise, if Wally is currently passive but the level of pertinence of the meeting has grown for him, he may be shown as becoming more likely to become an active participant. Opacity as generally represented in FIG. 12 can be one such indicator, however it is understood that any other visual indicator or indicators can be used instead of or in addition to opacity, e.g., a color gradient, a pie-chart, a sliding level indicator, size change of a user's image, and so forth. In addition to pertinence, similar indicators can be used for concepts such as participant speaking percentages within a recent timeframe, current emotions, and so forth.

Figure 13:
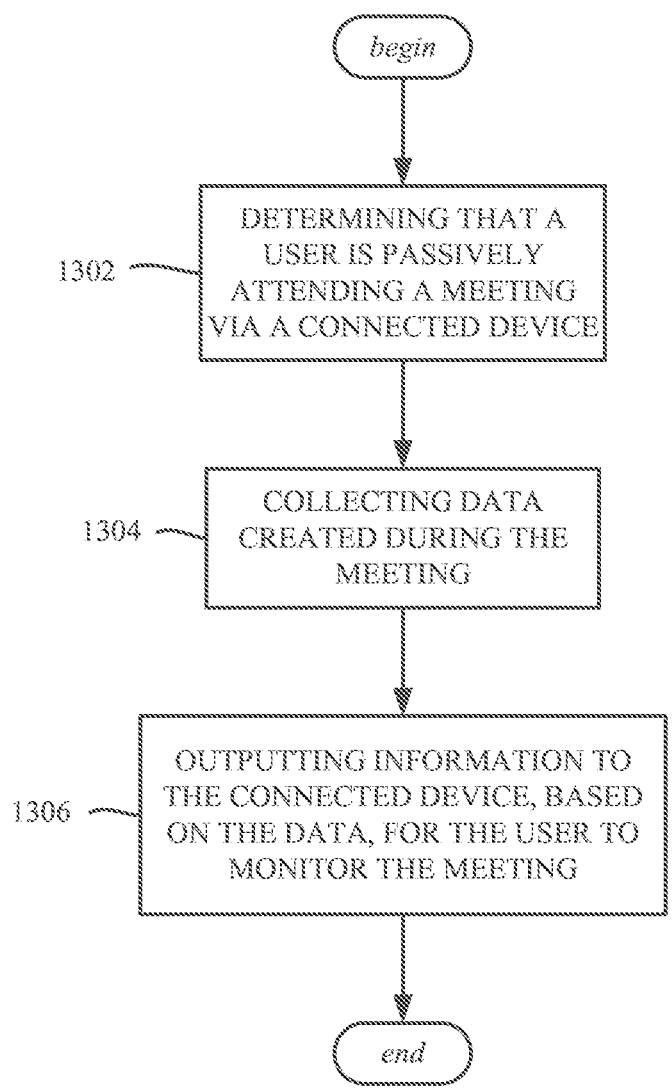
FIG. 13 is a flow diagram representing example operations related to collecting data for a user to monitor a passively attended meeting, in accordance with various aspects and embodiments of the subject disclosure.

One or more example aspects are represented in FIG. 13, and can correspond to a system, including a processor, and a memory that stores executable instructions that, when executed by the processor, facilitate performance of operations. Example operation 1302 represents determining that a user is passively attending a meeting via a connected device. Example operation 1304 represents collecting data created during the meeting. Example operation 1306 represents outputting information to the connected device, based on the data, for the user to monitor the meeting.

Further operations can include generating a transcript based on the collecting the data for output of text of the transcript to the connected device. Further operations can include parsing the transcript to make a text representation of a summary of dialog available within the transcript for output to the connected device. Further operations can include parsing the transcript to match a part of the transcript to user-specified interest keyword data, and making a text representation of the part of the transcript available for output to the connected device. Further operations can include analyzing the transcript, and determining, in response to a result of the analyzing of the transcript satisfying a user-specified join threshold criterion, to join the user to the meeting as an active participant.

Further operations can include determining a frequency value indicative of how often user-specified keyword data matches speech of a participant, and outputting a representation of the frequency value to the connected device.

Further operations can include maintaining speaking time data comprising respective time data for respective attendees who spoke during the meeting, and outputting a representation of the speaking time data to the connected device.

Further operations can include estimating an emotional state of a participant of the meeting, and outputting a representation of the emotional state to the connected device.

Further operations can include maintaining attendance data of active participants and passive participants for output of a representation of the attendance data to the connected device.

Further operations can include, based on the collecting of the data, generating summary data representative of a summary comprising a playback of a portion of the meeting, and outputting the summary data to the connected device.

Further operations can include generating a transcript based on the collecting of the data, and obtaining a pertinence level value representative of a pertinence level based on matching transcript data in the transcript to user-specified keyword data.

Further operations can include determining that the pertinence level has satisfied a pertinence-level criterion, and, in response to the determining that the pertinence level has satisfied the pertinence-level criterion, establishing a catch-up point with respect to the meeting, and generating summary data based on the collecting of the data, the summary data comprising meeting content data and meeting activity data from the catch-up point through a catch-up interval, for output of the summary data to the connected device. Further operations can include obtaining respective pertinence level values for respective attendees of the meeting, and outputting respective visible representation data, relative to the respective attendees, that represents the respective pertinence level values of the respective attendees.

Figure 14:
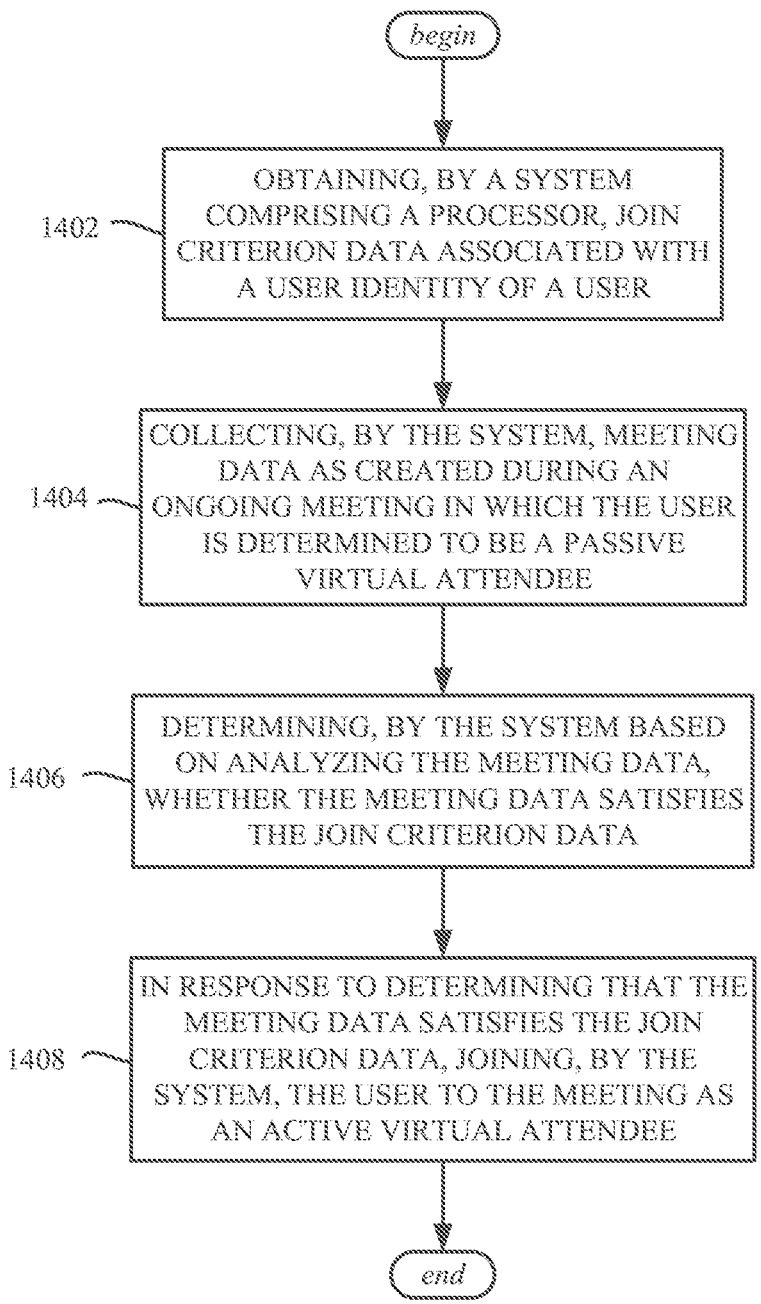
FIG. 14 is a flow diagram representing example operations related to joining a user to a meeting based on join criteria being satisfied based on collected meeting data, in accordance with various aspects and embodiments of the subject disclosure.

One or more example aspects are represented in FIG. 14, and, for example, can correspond to operations, such as of a method. Example operation 1402 represents obtaining, by a system comprising a processor, join criterion data associated with a user identity of a user. Example operation 1404 represents collecting, by the system, meeting data as created during an ongoing meeting in which the user is determined to be a passive virtual attendee. Example operation 1406 represents determining, by the system based on analyzing the meeting data, whether the meeting data satisfies the join criterion data. Example operation 1408 represents, in response to determining that the meeting data satisfies the join criterion data, joining, by the system, the user to the meeting as an active virtual attendee.

The join criterion data can include keyword-based data, the meeting can include dialog spoken during the ongoing meeting by meeting participants, and determining whether the meeting data satisfies the join criterion data can include evaluating the keyword-based data with respect to the dialog.

Further operations can include, prior to joining the user to the meeting and based on the meeting data, sending, by the system, summary information, addressed to the user identity, with a summary of event data describing prior events of the ongoing meeting, viewable at a user device via which the user is attending as the passive virtual attendee.

Collecting of the meeting data can include at least one of: generating a text transcript at substantially a same time as dialog spoken during the ongoing meeting, predicting respective emotional states of respective meeting attendees, determining pertinence level data, or determining respective participation level data of respective meeting attendees.

Further operations can include outputting, to a user device via which the user is attending as the passive virtual attendee, a visible representation of at least part of the meeting data.

Figure 15:
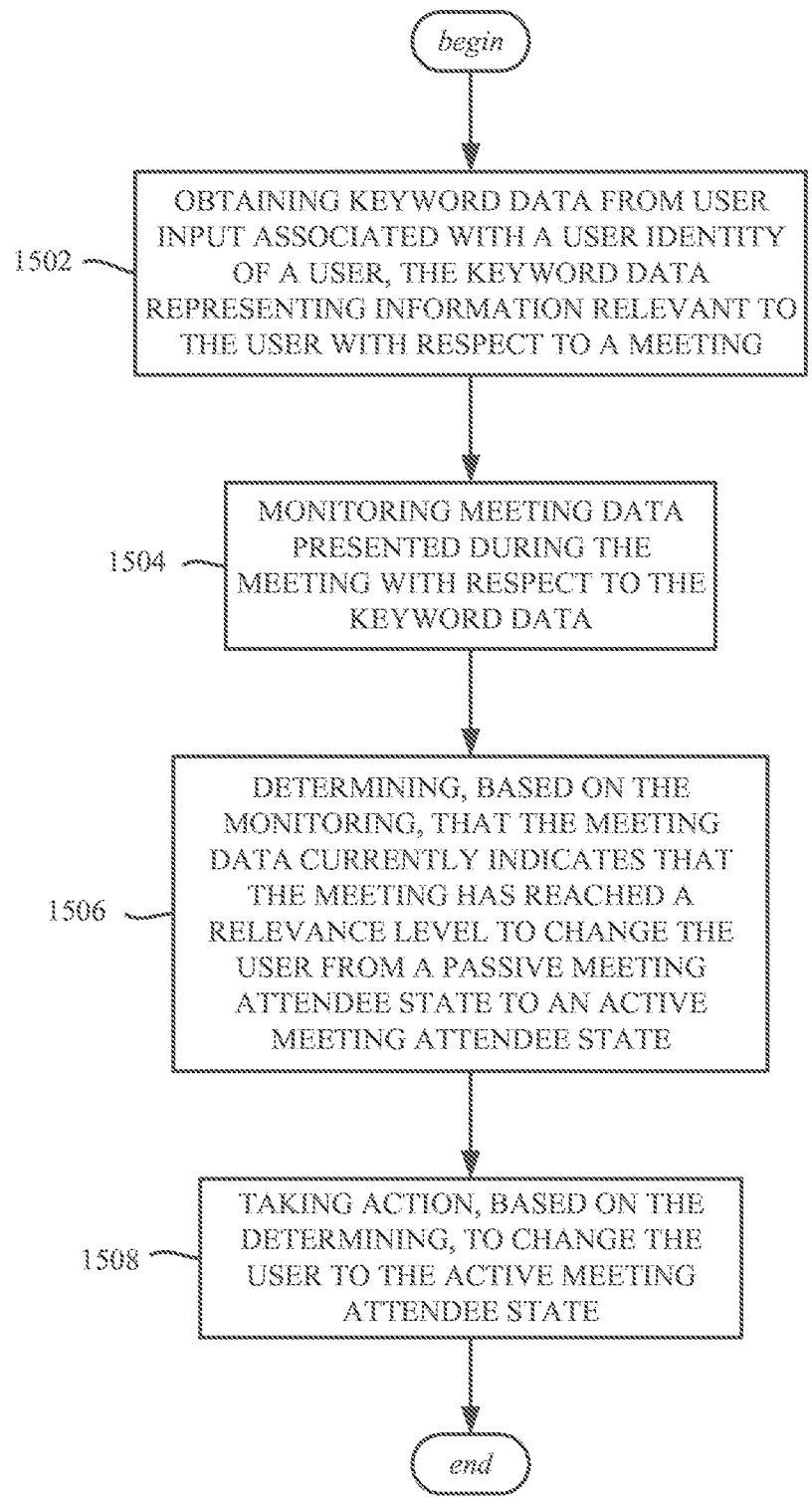
FIG. 15 is a flow diagram representing example operations related to taking action to join a user to from a passive meeting attendee state to an active meeting attendee state upon determining keyword data of the meeting reaches a relevance level for the user, in accordance with various aspects and embodiments of the subject disclosure.

One or more aspects are represented in FIG. 15, such as implemented in a machine-readable medium, including executable instructions that, when executed by a processor, facilitate performance of operations. Example operation 1502 represents obtaining keyword data from user input associated with a user identity of a user, the keyword data representing information relevant to the user with respect to a meeting. Example operation 1504 represents monitoring meeting data presented during the meeting with respect to the keyword data. Example operation 1506 represents determining, based on the monitoring, that the meeting data currently indicates that the meeting has reached a relevance level to change the user from a passive meeting attendee state to an active meeting attendee state. Example operation 1508 represents taking action, based on the determining, to change the user to the active meeting attendee state.

Taking the action can include providing event data to the user, based on the meeting data, to facilitate preparing the user to join the meeting, and joining the user to the meeting as an active meeting attendee.

As can be seen, the technology described herein facilitates user time management by providing a more efficient way for a user to participate actively and productively in meetings. A user may be an active participant in one or more meetings at a given time and may also be a passive participant in one or more meetings at the same time. The user's participation in active meetings may include an audio/video/virtual reality/multimedia or other experience. The user's participation in the passive meeting(s) may include a number of features that permits the user to monitor the passive meetings and either choose to join or be automatically joined to the meeting if conditions warrant. The technology described herein also allows the user to "catch up" on the events of a meeting that occurred while he or she was passively monitoring the meeting.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 16:
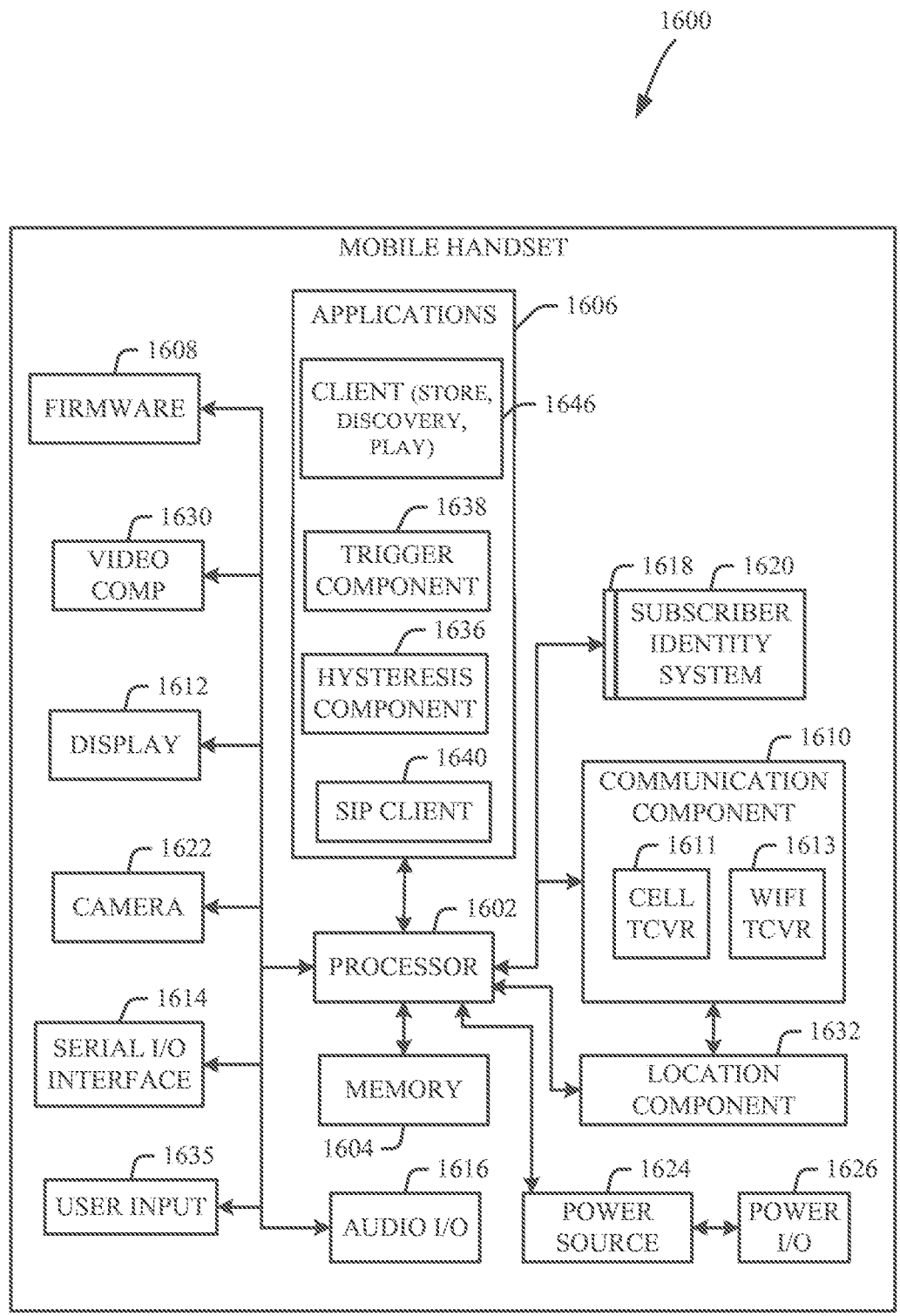
FIG. 16 illustrates an example block diagram of an example mobile handset operable to engage in a system architecture that facilitates wireless communications according to one or more embodiments described herein.

Referring now to FIG. 16, illustrated is a schematic block diagram of an example end-user device (such as user equipment) that can be a mobile device 1600 capable of connecting to a network in accordance with some embodiments described herein. Although a mobile handset 1600 is illustrated herein, it will be understood that other devices can be a mobile device, and that the mobile handset 1600 is merely illustrated to provide context for the embodiments of the various embodiments described herein. The following discussion is intended to provide a brief, general description of an example of a suitable environment 1600 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1600 includes a processor 1602 for controlling and processing all onboard operations and functions. A memory 1604 interfaces to the processor 1602 for storage of data and one or more applications 1606 (e.g., a video player software, user feedback component software, etc.). Other applications can include voice recognition of predetermined voice commands that facilitate initiation of the user feedback signals. The applications 1606 can be stored in the memory 1604 and/or in a firmware 1608, and executed by the processor 1602 from either or both the memory 1604 or/and the firmware 1608. The firmware 1608 can also store startup code for execution in initializing the handset 1600. A communications component 1610 interfaces to the processor 1602 to facilitate wired/wireless communication with external systems, e.g., cellular networks, VoIP networks, and so on. Here, the communications component 1610 can also include a suitable cellular transceiver 1611 (e.g., a GSM transceiver) and/or an unlicensed transceiver 1613 (e.g., Wi-Fi, WiMax) for corresponding signal communications. The handset 1600 can be a device such as a cellular telephone, a PDA with mobile communications capabilities, and messaging-centric devices. The communications component 1610 also facilitates communications reception from terrestrial radio networks (e.g., broadcast), digital satellite radio networks, and Internet-based radio services networks.

The handset 1600 includes a display 1612 for displaying text, images, video, telephony functions (e.g., a Caller ID function), setup functions, and for user input. For example, the display 1612 can also be referred to as a "screen" that can accommodate the presentation of multimedia content (e.g., music metadata, messages, wallpaper, graphics, etc.). The display 1612 can also display videos and can facilitate the generation, editing and sharing of video quotes. A serial I/O interface 1614 is provided in communication with the processor 1602 to facilitate wired and/or wireless serial communications (e.g., USB, and/or IEEE 1694) through a hardwire connection, and other serial input devices (e.g., a keyboard, keypad, and mouse). This supports updating and troubleshooting the handset 1600, for example. Audio capabilities are provided with an audio I/O component 1616, which can include a speaker for the output of audio signals related to, for example, indication that the user pressed the proper key or key combination to initiate the user feedback signal. The audio I/O component 1616 also facilitates the input of audio signals through a microphone to record data and/or telephony voice data, and for inputting voice signals for telephone conversations.

The handset 1600 can include a slot interface 1618 for accommodating a SIC (Subscriber Identity Component) in the form factor of a card Subscriber Identity Module (SIM) or universal SIM 1620, and interfacing the SIM card 1620 with the processor 1602. However, it is to be appreciated that the SIM card 1620 can be manufactured into the handset 1600, and updated by downloading data and software.

The handset 1600 can process IP data traffic through the communication component 1610 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1622 (e.g., a camera) can be provided for decoding encoded multimedia content. The video processing component 1622 can aid in facilitating the generation, editing and sharing of video quotes. The handset 1600 also includes a power source 1624 in the form of batteries and/or an AC power subsystem, which power source 1624 can interface to an external power system or charging equipment (not shown) by a power I/O component 1626.

The handset 1600 can also include a video component 1630 for processing video content received and, for recording and transmitting video content. For example, the video component 1630 can facilitate the generation, editing and sharing of video quotes. A location tracking component 1632 facilitates geographically locating the handset 1600. As described hereinabove, this can occur when the user initiates the feedback signal automatically or manually. A user input component 1634 facilitates the user initiating the quality feedback signal. The user input component 1634 can also facilitate the generation, editing and sharing of video quotes. The user input component 1634 can include such conventional input device technologies such as a keypad, keyboard, mouse, stylus pen, and/or touch screen, for example.

Referring again to the applications 1606, a hysteresis component 1636 facilitates the analysis and processing of hysteresis data, which is utilized to determine when to associate with the access point. A software trigger component 1638 can be provided that facilitates triggering of the hysteresis component 1638 when the Wi-Fi transceiver 1613 detects the beacon of the access point. A SIP client 1640 enables the handset 1600 to support SIP protocols and register the subscriber with the SIP registrar server. The applications 1606 can also include a client 1642 that provides at least the capability of discovery, play and store of multimedia content, for example, music.

The handset 1600, as indicated above related to the communications component 810, includes an indoor network radio transceiver 1613 (e.g., Wi-Fi transceiver). This function supports the indoor radio link, such as IEEE 802.11, for the dual-mode GSM handset 1600. The handset 1600 can accommodate at least satellite radio services through a handset that can combine wireless voice and digital radio chipsets into a single handheld device.

Figure 17:
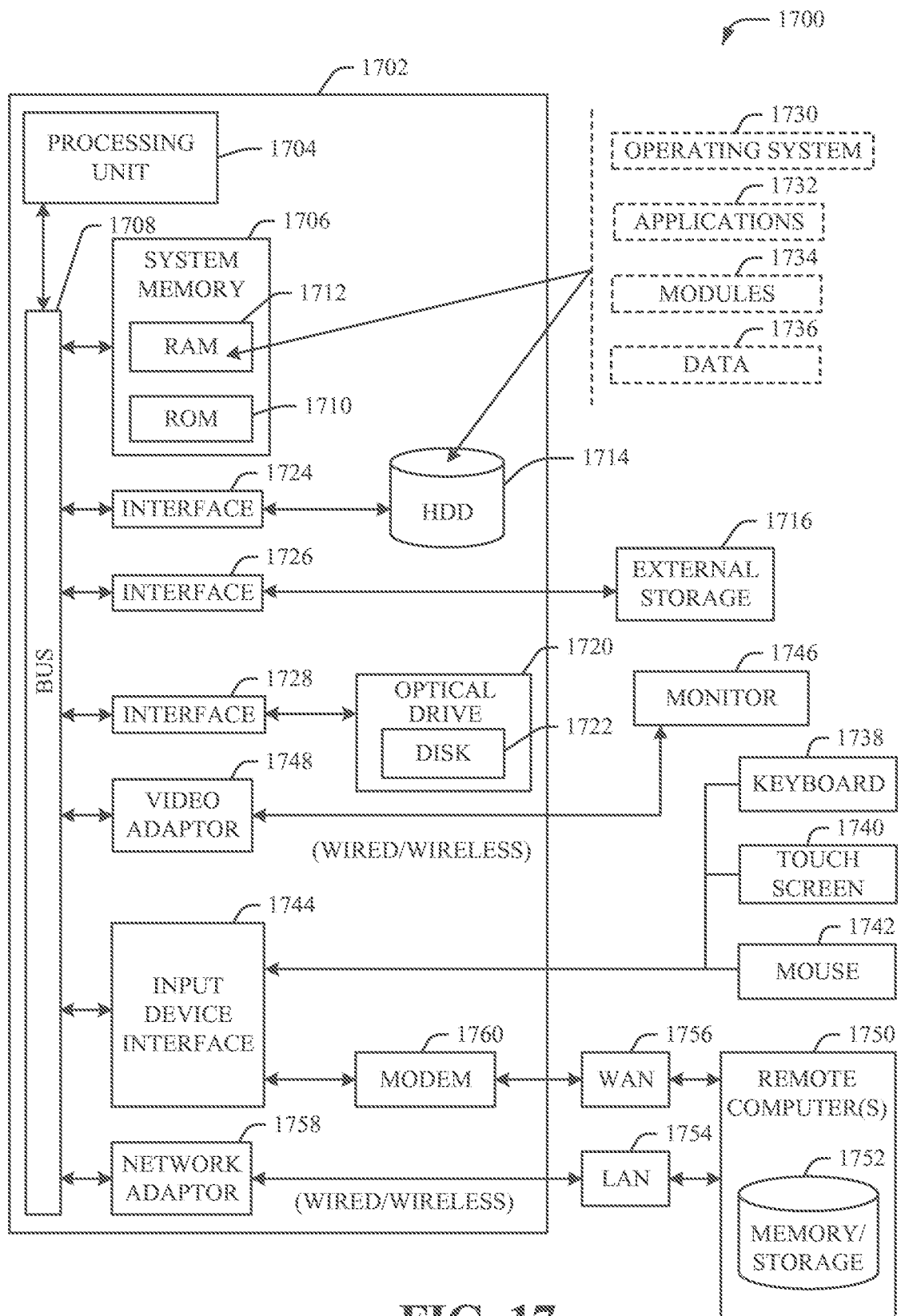
FIG. 17 illustrates an example block diagram of an example computer/machine system operable to engage in a system architecture that facilitates wireless communications according to one or more embodiments described herein.

In order to provide additional context for various embodiments described herein, FIG. 17 and the following discussion are intended to provide a brief, general description of a suitable computing environment 1700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

The computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid state drive (SSD), non-volatile memory and other storage technology could be used in addition to, or in place of, an HDD 1714, and can be internal or external. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1694 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally include emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can include one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can be enabled with a security module, such as a trusted processing module (TPM). For instance with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1694 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the Internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 17 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:
1. A system, comprising:
a processor; and
a memory that stores executable instructions that, when executed by the processor of the system, facilitate performance of operations, the operations comprising:
determining that a user is passively attending a first virtual meeting at a same time the user is attending a second meeting via a connected device;
collecting data created during the first virtual meeting;
outputting information to the connected device, based on the data, for the user to monitor the first virtual meeting;
generating a transcript based on the collecting the data for output of text of the transcript to the connected device;
parsing the transcript to match a part of the transcript to user- specified keyword data;
determining, in response to detecting the user-specified keyword data in the transcript, that the user should be joined to the first virtual meeting as an active participant while the first virtual meeting is still in progress;
automatically joining the user to the first virtual meeting as an active participant, in response to the determining that the user should be joined to the first virtual meeting; and
transitioning the user from an active participant of the second meeting to a passive participant of the second meeting,
wherein the automatically joining and the transitioning comprise beginning to output an audio feed associated with the first virtual meeting via the connected device while ceasing to output an audio feed associated with the second meeting via the connected device.

2. The system of claim 1, wherein the operations further comprise parsing the transcript to make a text representation of a summary of dialog available within the transcript for output to the connected device.

3. The system of claim 1, wherein the operations further comprise making a text representation of the part of the transcript available for output to the connected device.

4. The system of claim 1, wherein the operations further comprise determining a frequency value indicative of how often the user-specified keyword data matches speech of a participant, and outputting a representation of the frequency value to the connected device.

5. The system of claim 1, wherein the operations further comprise maintaining speaking time data comprising respective time data for respective attendees who spoke during the first virtual meeting, and outputting a representation of the speaking time data to the connected device.

6. The system of claim 1, wherein the operations further comprise estimating an emotional state of a participant of the first virtual meeting, and outputting a representation of the emotional state to the connected device.

7. The system of claim 1, wherein the operations further comprise maintaining attendance data of active participants and passive participants for output of a representation of the attendance data to the connected device.

8. The system of claim 1, wherein the operations further comprise, based on the collecting of the data, generating summary data representative of a summary comprising a playback of a portion of the first virtual meeting, and outputting the summary data to the connected device.

9. The system of claim 1, wherein the operations further comprise obtaining a pertinence level value representative of a pertinence level based on matching transcript data in the transcript to the user-specified keyword data.

10. The system of claim 9, wherein the operations further comprise determining that the pertinence level has satisfied a pertinence-level criterion, and, in response to the determining that the pertinence level has satisfied the pertinence-level criterion, establishing a catch-up point with respect to the first virtual meeting, and generating summary data based on the collecting of the data, the summary data comprising meeting content data and meeting activity data from the catch-up point through a catch-up interval, for output of the summary data to the connected device.

11. The system of claim 9, wherein the operations further comprise obtaining respective pertinence level values for respective attendees of the first virtual meeting, and outputting respective visible representation data, relative to the respective attendees, that represents the respective pertinence level values of the respective attendees.

12. A method, comprising:
obtaining, by a system comprising a processor, a join criterion associated with a user identity of a user, wherein the join criterion comprises keyword-based data;
collecting, by the system, meeting data as created during a first ongoing meeting in which the user is determined to be a passive virtual attendee at a same time the user is an active virtual attendee at a second ongoing meeting, wherein the first ongoing meeting comprises dialog spoken during the first ongoing meeting by meeting participants and wherein the collecting of the meeting data comprises generating a text transcript at substantially a same time as the dialog is spoken;
determining, by the system based on analyzing the meeting data, that the join criterion has been satisfied, wherein the determining comprises evaluating the keyword-based data with respect to the dialog; and
in response to determining that the join criterion has been satisfied, joining, by the system, the user to the first ongoing meeting as an active virtual attendee while the first ongoing meeting is in progress, wherein the joining comprises beginning to output an audio feed associated with the first ongoing meeting via a user device of the user while ceasing to output an audio feed associated with the second ongoing meeting via the user device.

13. The method of claim 12, further comprising, prior to joining the user to the first ongoing meeting and based on the meeting data, sending, by the system, summary information, addressed to the user identity, with a summary of event data describing prior events of the first ongoing meeting, viewable at the user device via which the user is attending as the passive virtual attendee.

14. The method of claim 12, wherein the collecting of the meeting data further comprises at least one of: predicting respective emotional states of respective meeting attendees, determining pertinence level data, or determining respective participation level data of respective meeting attendees.

15. The method of claim 12, further comprising outputting, to the user device via which the user is attending as the passive virtual attendee, a visible representation of at least part of the meeting data.

16. A non-transitory machine-readable medium, comprising executable instructions that, when executed by a processor, facilitate performance of operations, the operations comprising:
obtaining keyword data from user input associated with a user identity of a user, the keyword data representing information relevant to the user with respect to a first virtual meeting that is a passive meeting of the user at a same time a second virtual meeting is occurring that is an active meeting of the user;
monitoring meeting data presented during the first virtual meeting with respect to the keyword data, wherein the monitoring comprises:
generating a transcript based on the first virtual meeting; and
parsing the transcript to match a part of the transcript to the keyword data;
determining, in response to detecting the keyword data in the transcript, that the meeting data currently indicates that the first virtual meeting has reached a relevance level to change the user from a passive meeting attendee state to an active meeting attendee state; and
taking an action, in response to the determining, to change the user from the passive meeting attendee state to the active meeting attendee state for the first virtual meeting, wherein the taking the action comprises beginning to output an audio feed associated with the first virtual meeting via a user device of the user while ceasing to output an audio feed associated with the second virtual meeting via the user device.

17. The non-transitory machine-readable medium of claim 16, wherein the taking the action further comprises providing event data to the user, based on the meeting data, to facilitate preparing the user to join the first virtual meeting, and joining the user to the first virtual meeting as an active meeting attendee.

18. The non-transitory machine-readable medium of claim 16, wherein the operations further comprise estimating an emotional state of a participant of the first virtual meeting, and outputting a representation of the emotional state to the user device of the user.

19. The non-transitory machine-readable medium of claim 16, wherein the operations further comprise maintaining attendance data of active participants and passive participants for output of a representation of attendance data of the first virtual meeting to the user device of the user.

20. The non-transitory machine-readable medium of claim 16, wherein the operations further comprise obtaining a pertinence level value representative of a pertinence level based on matching transcript data in the transcript to the keyword data.

* * * * *